No. 856,826. PATENTED JUNE 11, 1907.
R. WEBB.
STUMP SAWING MACHINE.
APPLICATION FILED NOV. 6, 1906.
3 SHEETS—SHEET 1.
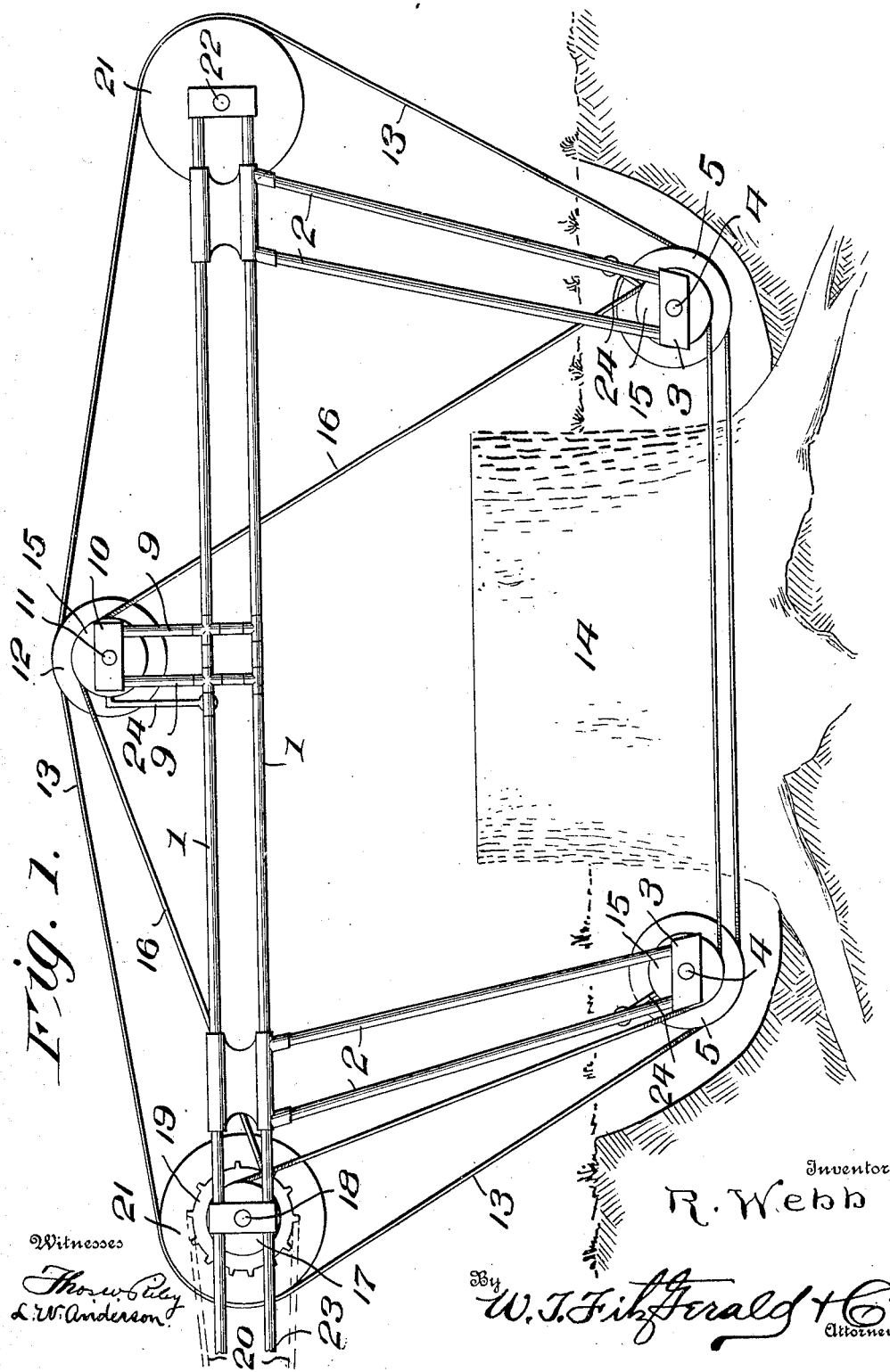

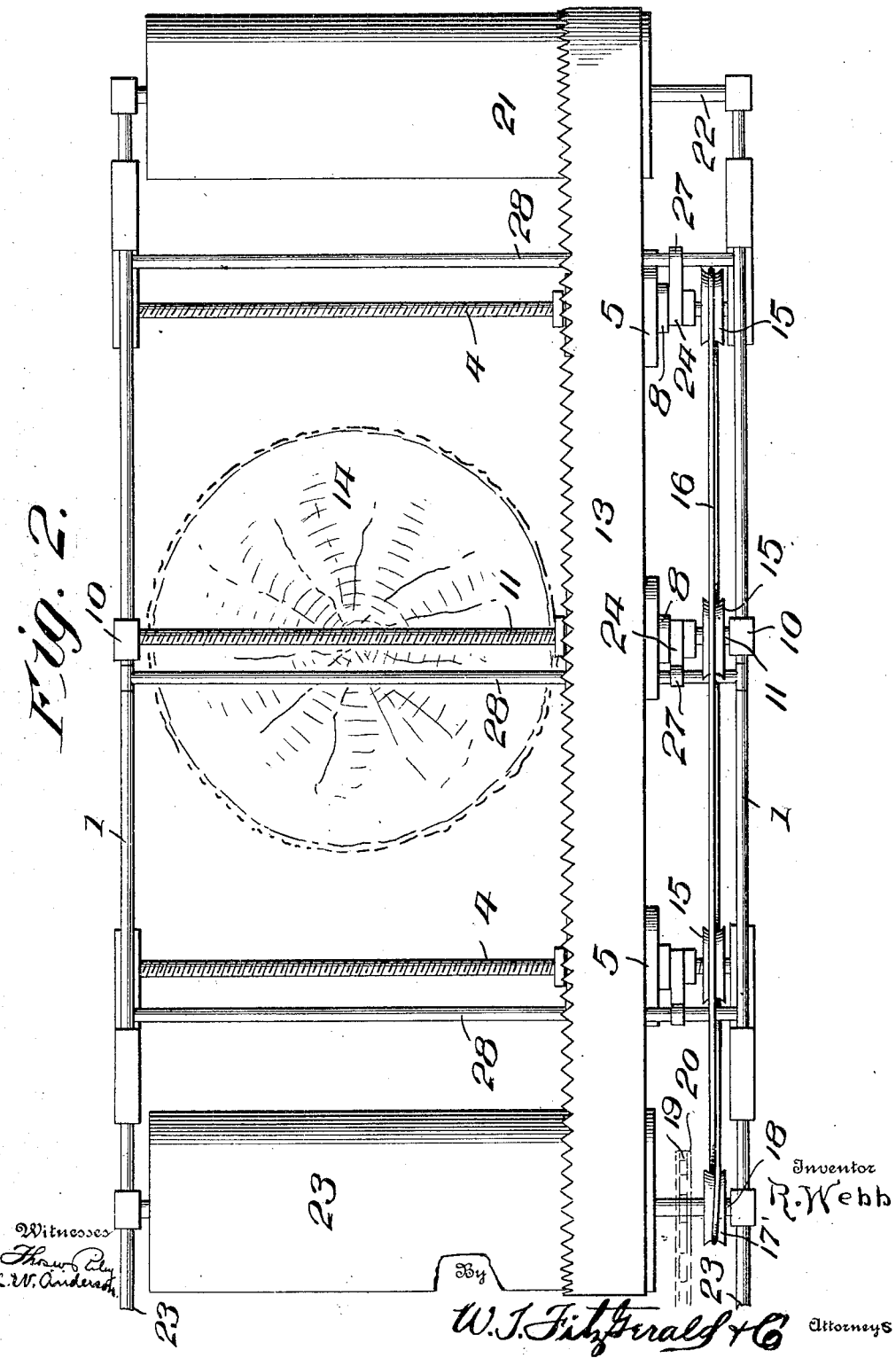

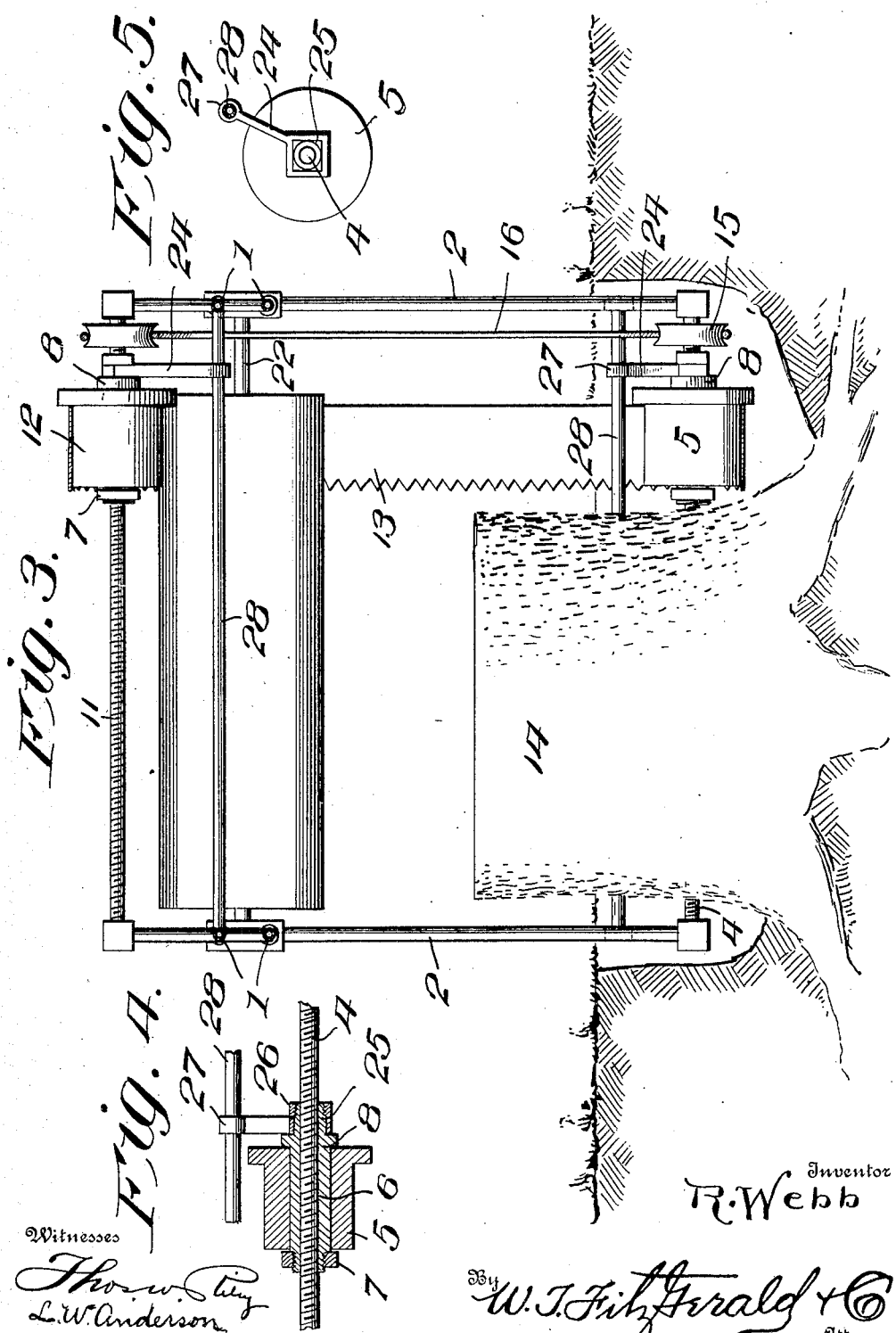

UNITED STATES PATENT OFFICE.

ROBERT WEBB, OF HOWARD, KANSAS.

STUMP-SAWING MACHINE.

No. 856,826.          Specification of Letters Patent.          Patented June 11, 1907.

Application filed November 6, 1906. Serial No. 342,228.

*To all whom it may concern:*

Be it known that I, ROBERT WEBB, a citizen of the United States, residing at Howard, in the county of Elk and State of Kansas, have invented certain new and useful Improvements in Stump-Sawing Machines; and I do hereby declare the following to be a full, clear, and exact description of the invention, such as will enable others skilled in the art to which it appertains to make and use the same.

My invention relates to a sawing appliance, and more particularly to a machine designed for removing stumps by cutting them off at any desired point below the surface of the ground, whereby the portion of the stump remaining will offer no obstruction to the plow in tilling the soil.

The prime object of my invention is to provide a simple, though reliably efficient mechanism of the character specified whereby the upper portion of the stump above the roots and such portion of the roots themselves may be readily severed at a point considerably below the general surface of the soil, thus permitting the remaining portion of the stump or tree to remain out of the way of the plows and cultivators and thus permitting the soil to be thrown back upon the remaining roots and leaving the latter to rot.

Other objects and advantages will be made clearly apparent from the following specification, considered in connection with the accompanying drawings, in which—

Figure 1 shows a side elevation of my stump-removing machine disposed in its operative position to remove the upper portion of the stump. Fig. 2 is a top plan view thereof. Fig. 3 is a transverse section of my sawing machine. Fig. 4 is a detail view showing means employed to control the belt saw, while, Fig. 5 is a detail showing an end section of Fig. 4 from the right-hand side thereof.

Like numerals refer to corresponding parts throughout the several views.

In carrying out my invention I provide a suitable frame-work upon which I mount a belt saw and I provide said belt saw with means to move the same laterally upon its supporting framework at the same time it is driven in the performance of its work of sawing the stump.

A suitable supporting framework, consisting preferably of a pair of parallel bars 1, which may be made in any desired manner, preferably of pipe sections in order to insure strength combined with lightness, is provided, and, depending from said members 1 and secured rigidly thereto in any desired way are the brackets 2, there being duplicates of said parts for each side of the framework and mounted in the lower ends of the brackets 2 so as to rotate in the cross bars or connecting member 3, are the shafts 4, which are threaded and are designed to carry the saw band wheels 5, there being one of said wheels upon each of the shafts 4.

By reference to Fig. 4 it will be observed that the wheels 5 are rotatably mounted upon the sleeves 6, said sleeves being internally threaded to fit upon the threaded shafts 4 and the wheels 5 are held upon the sleeve by the nut 7 and the collar 8, as clearly shown in detail in said Fig. 4. On the upper part of the framework or near the middle portions of the members 1 I provide the standards 9 connected with the cross bar or bracket 10, and in said cross bar I dispose the shaft 11 upon which the saw band-carrying wheel 12 is disposed, said wheel 12 being provided with a sleeve 6 as shown in Fig. 4.

By reference to Fig. 3 the belt saw 13 is shown as extending around the carrying wheels 5 and 12, the two wheels 5 being shown at the bottom of the framework, and, in order that the saw belting may travel laterally incident to sawing off the upper portion of the stump (the latter being designated by the numeral 14) I provide that the shafts 4 and 11 shall be threaded to fit the internally-threaded bore of the sleeves 6, and since suitable driving pulleys 15 are rigidly secured to the shafts 4 and 11 to accommodate the driving belt 16, it follows that said belt saw will be gradually moved from one side of the machine to the other acording to the speed of rotation of the shafts 4 and 11. The driving belt 16, it will be observed, passes around the driving pulley 17, which latter is rigidly secured upon the shaft 18, the said shaft being provided with the driving sprocket 19 driven by the sprocket chain or equivalent means 20 properly connected with the source of power.

By reference to Fig. 1 it will be further observed that the belt saw 13 not only extends around in connection with the actuating or driving wheels 5 and 12, but also extends around the drums 21, one of said drums being disposed upon the shaft 18 and the other upon the shaft 22 at the opposite end of the framework.

In Figs. 1 and 2 it will also be observed that the frame sections 1 are shown as broken away such broken-away terminal being indicated by the numeral 23 and it will be understood that they extend into connection with any suitable controlling or carrying truck (not shown), whereby the entire framework may be bodily lifted above the stump until a proper amount of excavation has been provided around the same so that the saw may be lowered in such position as to readily remove the upper portion thereof. The shafts 4 and 11 being threaded are designed to actuate the sleeves 6 and incidentally move the belt carriers 5 and 12 coincident with the pitch of the threads upon said shafts, which it will be understood are so made as to insure that the saw will travel laterally, but very gradually until it has passed entirely through the stump and severed the same at the desired point. By reversing the movement of the driving belt 16 the saw belt will obviously be moved back again to its original position so that the machine or truck carrying the framework containing the saw and its driving mechanism may be moved and adjusted to apply the saw upon the next stump to be removed. As the saw belt is gradually forced laterally through the stump it will in addition to passing around the carrying wheels 5 and 12, also pass around the carrying drums 21 and will slide gradually along said drums from one end to the other thereof and may be again moved back to the starting point by reversing the movement of the shafts 4 and 11, as will be obvious.

In order to steady and reinforce the lateral movement of the saw belt carrying wheels 5 and 12 I provide the anchoring arm 24 for each of the sleeves 6, said arms being secured upon the squared outer end 25 of the sleeves 6 in any suitable way as by the nut 26. The other end of the arm 24 is provided with an eye or ring-like terminal 27, which is designed to fit loosely around the guiding rod or bar 28, held in place in any preferred way upon the framework and said arm 24 will therefore prevent the sleeve 6 from rotating upon the shaft 4 or 11 as the case may be, but at the same time permit the belt-carrying wheels 5 and 12 to turn freely thereupon.

Various modifications and changes may be made in the construction and combination of the several parts without departing from the spirit or scope of my invention.

What I claim is—

1. In a sawing machine of the class described comprising a frame, brackets on said frame, threaded shafts carried by said brackets, interiorly threaded sleeves on said shafts, means to hold said sleeves against rotation, wheels rotatably mounted on said sleeves, a band saw adapted to travel around said wheels, means to rotate said shafts, a drum at each end of said frame and extending the full width thereof and means to drive one of said drums whereby the saw will be moved longitudinally and laterally.

2. A sawing machine of the character described comprising a frame, threaded shafts extending laterally across said frame, saw carrying wheels mounted on said shafts, means to move said wheels longitudinally of the shafts, a drum at each end of said frame and extending the full width thereof, an endless saw adapted to travel over said drums and wheels and means to drive one of said drums whereby the saw will be moved longitudinally.

3. A stump sawing machine comprising a frame, a belt saw, carrying wheels for said belt saw, shafts mounted in said frame, means on said shafts to support said carrying wheels and move the same longitudinally on the shafts, a drum at each end of said frame and extending the full width thereof and means to drive one of said drums whereby the saw will be moved longitudinally and laterally.

4. A stump sawing machine comprising a frame, threaded shafts extending laterally across said frame, an interiorly threaded sleeve on each of said shafts, a collar adjacent one end of said sleeve and a nut at the opposite end thereof, a carrying wheel on said sleeve between said collar and nut, a band saw adapted to travel on said wheels, means to hold said sleeve against rotation and additional means to rotate said shafts whereby the sleeves and wheels thereon will be moved from end to end of said shafts.

In testimony whereof I have signed my name to this specification in the presence of two subscribing witnesses.

ROBERT WEBB.

Witnesses:
J. H. GRANT,
J. P. PEAHER.